No. 823,8[...]  
PATENTED JUNE 19, 1906.
G. E. CROWELL.  
DRIVE GEARING FOR MANURE SPREADERS.  
APPLICATION FILED FEB. 15, 1906.
2 SHEETS—SHEET 2.
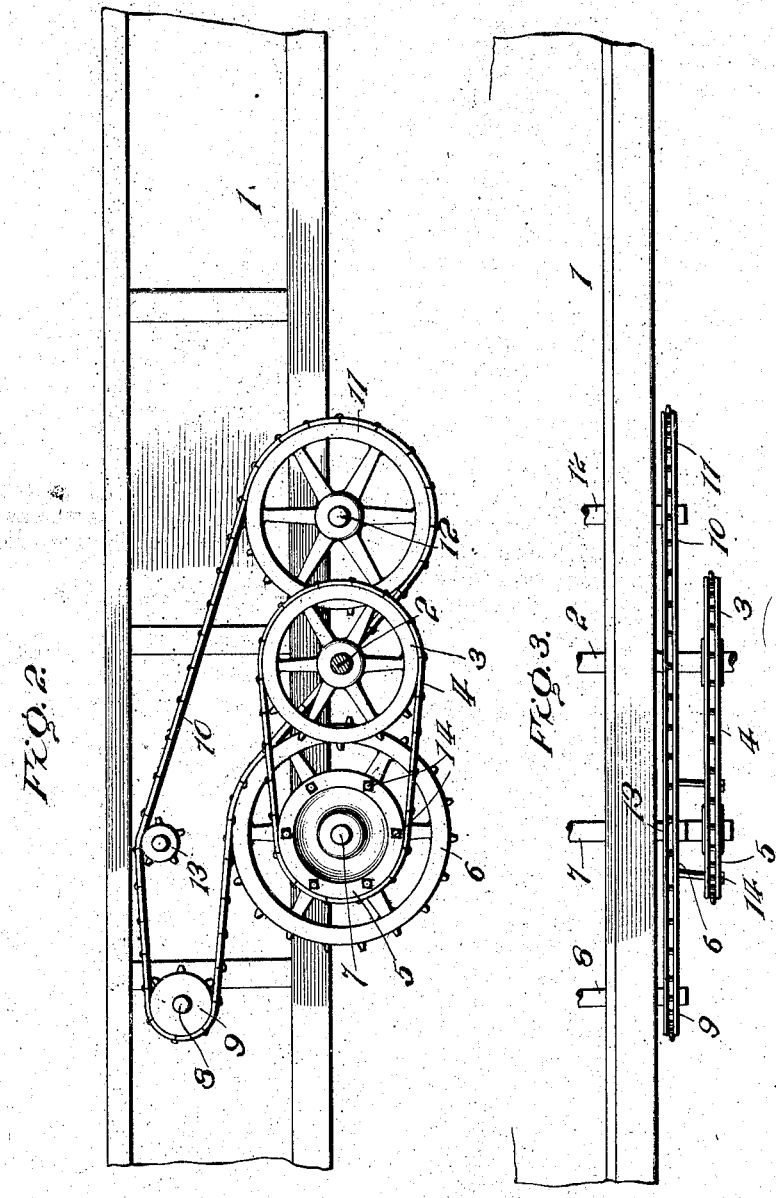
Witnesses  
N. N. Woodson
Inventor  
G. E. Crowell,  
By Lacey, Attorneys

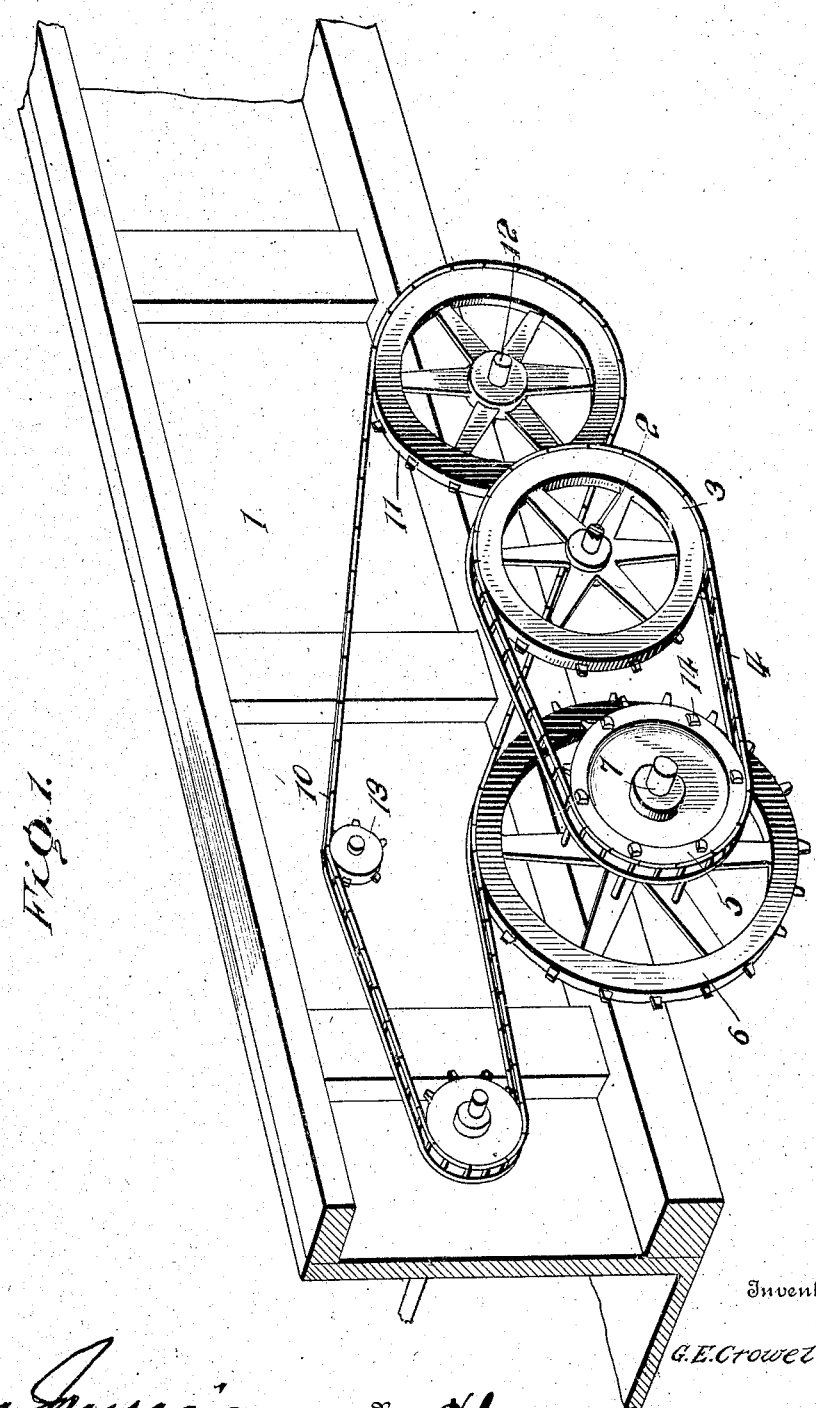

UNITED STATES PATENT OFFICE.

GUY E. CROWELL, OF MASON CITY, IOWA.

DRIVE-GEARING FOR MANURE-SPREADERS.

No. 823,846.      Specification of Letters Patent.      Patented June 19, 1906.

Application filed February 15, 1906. Serial No. 301,297.

*To all whom it may concern:*

Be it known that I, GUY E. CROWELL, a citizen of the United States, residing at Mason City, in the county of Cerro Gordo and State of Iowa, have invented certain new and useful Improvements in Drive-Gearing for Manure-Spreaders, of which the following is a specification.

This invention relates to manure-spreaders or fertilizing-machines of a similar type, and comprises novel drive-gearing for actuating the various parts of the spreader mechanism.

For a full description of the invention and the merits thereof and also to acquire a knowledge of the details of construction of the means for effecting the result reference is to be had to the following description and accompanying drawings, in which—

Figure 1 is a perspective view of gearing embodying the invention. Fig. 2 is a side elevation. Fig. 3 is a top plan view.

Corresponding and like parts are referred to in the following description and indicated in all the views of the drawings by the same reference characters.

The gearing embodying the invention is designed for that class of spreaders utilizing a feeding-apron, a feed-cylinder, and other parts. In the drawings the numeral 1 designates the side of the vehicle-body which forms a part of the ordinary spreader, the numeral 2 indicating the rear axle of the machine which is adapted to rotate and which has the sprocket 3 at one of its ends. Said sprocket 3 is preferably keyed to the axle and is mounted thereon adjacent to the inner side of the rear ground-wheel. The sprocket 3 is connected by a sprocket-chain 4 with an auxiliary sprocket 5 of a drive-sprocket 6, which is mounted on a stub-shaft 7, attached to the adjacent side sill of the body of the machine. The cylinder-shaft is indicated at 8 and carries a sprocket 9 at one end, a sprocket-chain 10, passing about sprocket 9, and a second sprocket 11, which is secured to one end of an apron-drive shaft 12. The sprocket 6 is in engagement with the sprocket-chain 10 at the lower portion thereof, a suitable idler-sprocket 13 being arranged to support the upper portion of the chain 10 as it moves about the sprockets 9 and 11. The auxiliary sprocket 5 is detachably secured to the sprocket 6, preferably by means of bolts 14, which pass through the rim portion of the sprocket 5 and the spokes of the sprocket 6.

The driving mechanism, hereinbefore set forth, is simple, and it is contemplated that the various gear parts are exchangeable for others of greater or less size to vary the relative movement of the elements of the feeding mechanism of the spreader. The sprocket 5 may be readily interchangeable, so as to occupy a position upon either side of the sprocket 6 should it be desired to place the drive-gearing upon either side of the spreader.

The sprocket 3, driven by the axle 2, transmits motion through the auxiliary sprocket 5 to the sprocket 6. The sprocket 6, engaging the sprocket-chain 10, transmits motion to the cylinder-shaft 8 as well as to the apron-driving shaft 12 and the sprockets applied to these shafts.

Having thus described the invention, what is claimed as new is—

In drive-gearing for manure-spreaders, the combination of an axle-sprocket, a drive-sprocket adjacent thereto, an auxiliary sprocket secured to the drive-sprocket at one side thereof, a sprocket-chain connecting the axle-sprocket with the auxiliary sprocket, an apron-driving shaft, a sprocket applied to said apron-driving shaft, a cylinder-shaft, a sprocket secured to said cylinder-shaft, a sprocket-chain connecting the sprockets of the cylinder-shaft and of the apron-driving shaft and having the lower lag thereof in engagement with the drive-sprocket above mentioned, and an idler-sprocket supporting the upper lag of the sprocket-chain which connects the cylinder-shaft and the apron-driving shaft.

In testimony whereof I affix my signature in presence of two witnesses.

GUY E. CROWELL. [L. S.]

Witnesses:
     J. M. FINLEY,
     B. F. BROWN.